J. H. MILLER.
TIRE RETREADING APPARATUS AND METHOD OF RETREADING TIRE CASINGS.
APPLICATION FILED OCT. 12, 1920.
1,375,528. Patented Apr. 19, 1921.
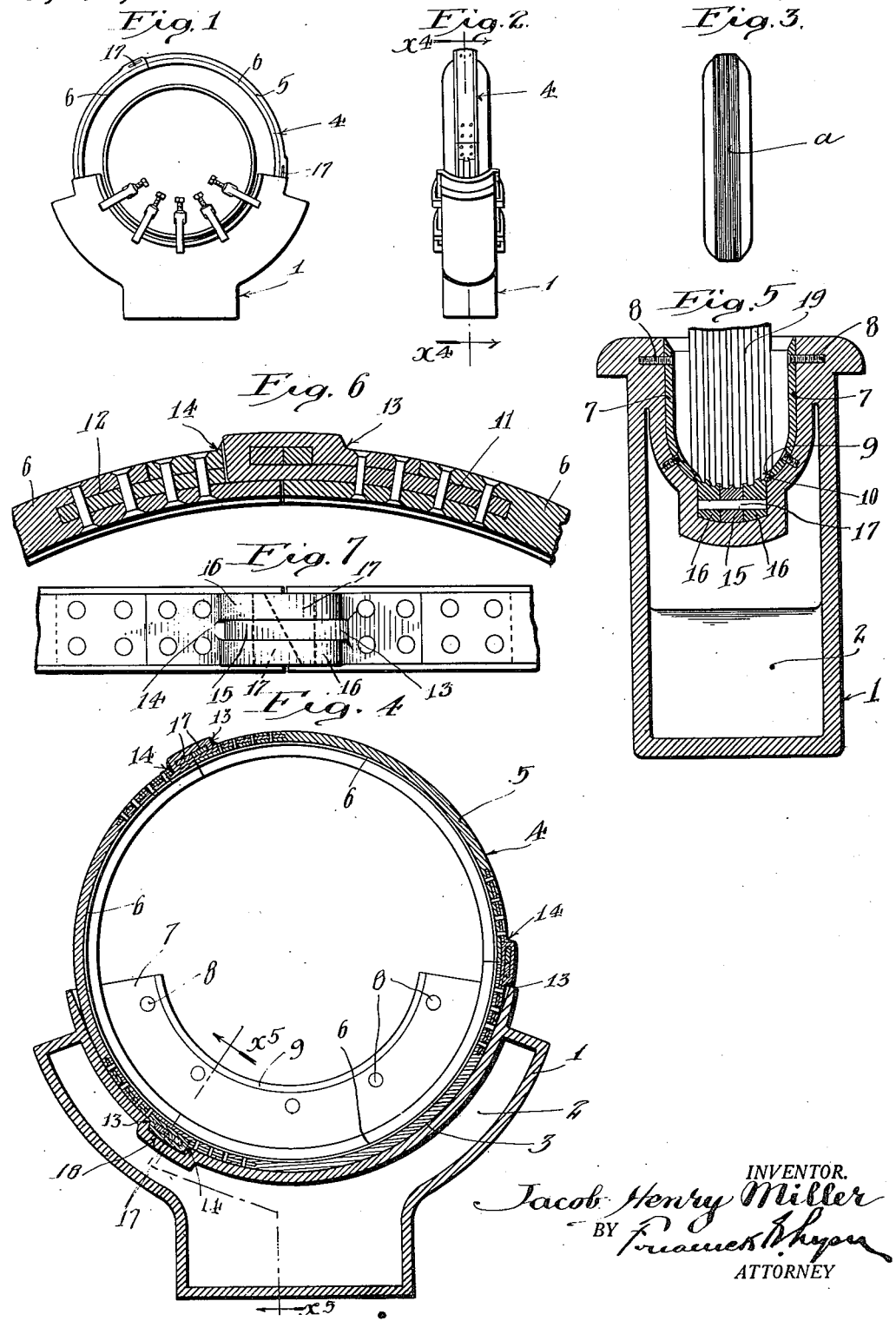

UNITED STATES PATENT OFFICE.

JACOB HENRY MILLER, OF SAN LUIS OBISPO, CALIFORNIA.

TIRE-RETREADING APPARATUS AND METHOD OF RETREADING TIRE-CASINGS.

1,375,528.   Specification of Letters Patent.   Patented Apr. 19, 1921.

Application filed October 12, 1920. Serial No. 416,496.

*To all whom it may concern:*

Be it known that I, JACOB HENRY MILLER, a citizen of the United States, and a resident of San Luis Obispo, county of San Luis Obispo, State of California, have invented a new and useful Tire-Retreading Apparatus and Method of Retreading Tire-Casings, of which the following is a specification.

This invention relates to vulcanizers of the type more especially employed for vulcanizing new treads on old tire casings.

An object of the invention is to produce a retreaded casing having the appearance of a new casing.

In vulcanizing a new tread upon an old casing, it is customary to provide the new tread with anti-skid designs of various kinds and, because of the variation in the diameters of the different casings, the casing retreaded by the apparatuses at present in use reveals, through mismatching of the different portions of the design, the point at which the first vulcanized section joins the last vulcanized section, in consequence of which it is nearly impossible to obtain a new-appearing tire from an old casing. The reason the old apparatuses produce the imperfections described above, is that the matrix portion carrying the anti-skid pattern extends but a portion of the way around the periphery of the casing and when the casing is rotated to bring a new portion thereof into juxtaposition with a completed portion the pattern does not match up with the completed portion of the design.

In contradistinction to prior retreading vulcanizers, this invention provides a matrix portion extending around the entire circumference of the casing, so that no matching up of one of the sections of the anti-skid design is necessary with respect to that portion previously produced.

A still further object of the invention is to so construct it that it is only necessary for the portion provided with the anti-skid pattern to entirely encircle the tire.

This invention also includes the method of retreading casings.

Other objects and advantages will appear hereinafter.

The accompanying drawings illustrate the invention:

Figure 1 is a side elevation of the invention with a tire casing mounted in place as it would be in the operation of vulcanizing a new tread thereon.

Fig. 2 is an edge view of Fig. 1.

Fig. 3 is an edge view of the casing shown in Figs. 1 and 2 after completion of the retreading operation.

Fig. 4 is an enlarged sectional elevation on line indicated by $X^4$—$X^4$ Fig. 2, omitting the tire casing and the clamps.

Fig. 5 is a sectional elevation on line indicated by $X^5$—$X^5$ Fig. 4.

Fig. 6 is an enlarged sectional elevation of the end portions of two matrix sections showing the connection therebetween.

Fig. 7 is a plan view of Fig. 6.

There is provided a hollow mold 1, the heating medium for the mold circulating through the chamber 2. The mold 1 has its upper face in the form of a trough 3 and is made of a length corresponding to the length of arc over which the vulcanizing operation is to be performed at one time without changing the position of the casing being operated on. In the drawings the trough is more than one third of a complete circle, but is less than a semi-circle. In the trough 3 is mounted a matrix 4. At least a portion of the matrix 4 forms a complete circle to entirely encircle the portion of the casing being operated on, such matrix portion therefore being in the form of a ring indicated at 5. The matrix ring 5 comprises similar separable sections 6, which may be of any desired length of arc. In the instance shown in the drawings the matrix ring 5 is formed in three sections, but a greater or less number of sections may be employed, if desired. The matrix 4 also comprises side plates 7 which, in this particular instance, need not extend around the full circle of the casing, are sectional and of substantially the same length of arc as the trough 3. The side plates 7 are stationarily secured by suitable fasteners indicated at 8.

The ring 5 of the matrix is adapted to be rotated in the mold between the side plates 7 and, in this particular instance, the side plates 7 and matrix sections 6 are provided with complementary beveled or chamfered engaging edges 9, 10, respectively. The matrix sections may be made of any suitable material and at present I prefer to make them of aluminium.

Means are provided to fasten the adjacent ends of the matrix sections together, and said means are constructed so as to draw together the ring sections to reduce the diameter of the matrix. In the instance shown in the drawings the ends of the matrix sections are connected together as follows: Each matrix section 6 is provided in its end edges with grooves 11, 12, respectively, in which are inserted interfitting coupling members 13, 14, respectively, the outer end of the coupling member 14 forming a pair of eyes 16 which embrace the eye 15 between them. Driven into the eyes 15, 16 are wedges 17 having their tapered faces engaging one another and the wedges being driven from opposite sides of the matrix. When the wedges 17 are in place they constitute a key adapted to prevent separation of the eyes. When the wedges are being driven into place they draw the eye 15 farther and farther between the eyes 16 so as to contract the diameter of the matrix.

The eyes 15, 16 form an outwardly projecting boss or lug and, since there are three matrix sections shown in the drawings, there are in this instance three of such lugs. Any one of the lugs thus formed is adapted to fit in a recess 18, formed in the trough 3 so that the lugs and the recess together constitute means to hold the matrix in different positions against rotation. To rotate the matrix it must first be raised slightly so as to withdraw the lug from the recess.

When it is desired to produce an anti-skid design on the casing, the matrix sections 6 will have their inner faces in the form of a suitable anti-skid pattern 19. In Fig. 5 of the drawings the anti-skid pattern is in the form of annular beads or rings, but it is to be understood that this form is merely typical and that any pattern whatsoever may be employed such, for example, as diamond shape projections, circular projections or cup shape recesses.

The trough 3 is shown in Fig. 4 as having its ends tapered outwardly, in a manner well understood in this art, so as not to produce a mark upon the periphery of the casing at the point where the mold ends.

In vulcanizing a new tread upon an old casing, the matrix sections 6 will be applied one at a time and the adjoining sections will be connected together by the wedges 17, as above explained. The matrix ring 5 with the casing therein is then placed in the trough 3 with any one of the lugs 13, 14 positioned in the recess 18. While the portion of the casing adjacent the trough 3 is being cured, the tread thereof will engage in the configurations of the pattern 19. After the curing has been effected for that portion of the casing adjacent the trough 3, the ring 5 will be raised slightly and then rotated to bring another of the lugs into the recess 18 and the vulcanizing operation will proceed on another portion of the casing.

It is clear that, since that portion of the matrix having the anti-skid pattern thereon surrounds the tire and is not moved relative to the tread of the tire until the vulcanizing operation is completed, the anti-skid design $a$ on the completed casing will be uniform for the full circle of the tire and the tread show no point where the pattern does not accurately match up.

The anti-skid design illustrated is in the form of annular rings or beads, and very little difficulty will be found in producing such design on the tread of the casing even though prior apparatus be used; but when the design employed is one in which different projections or recesses thereof are spaced from one another peripherally of the casing, this invention provides for uniform spacing of such projections or recesses around the entire casing, so that the finished tread will not look patchy. By having the periphery of the side plate 7 of the matrix separable from the remainder thereof, a saving in material is effected and the construction of the apparatus is somewhat simplified, but it is clear that the side plates 7 could be circular and formed integral with the ring sections 6, if desired, so that not only the ring 5 of the matrix would extend entirely around the casing, but so that the entire matrix would.

I claim:

1. In a tire-retreading apparatus, the combination of a matrix formed in sections and at least a portion of the matrix forming a complete circle, and means to fasten the adjacent sections together.

2. In a tire-retreading apparatus, the combination of a trough, a matrix formed in sections and at least a portion of the matrix forming a complete circle, said circular portion being rotative in the trough, and means to fasten the adjacent sections together.

3. In a tire-retreading apparatus, the combination of a trough, and a matrix formed in sections, some of the sections being fastened along the sides of the trough and another of the sections fitting between the side sections.

4. In a tire-retreading apparatus, the combination of a trough, and a matrix formed in sections, some of the sections being fastened along the sides of the trough and other of the sections forming a ring rotatively fitting between the side sections.

5. In a tire-retreading apparatus, the combination of a trough, and a matrix formed at least in part by a sectional ring fitting in the trough.

6. In a tire-retreading apparatus, the combination of a matrix ring formed in sections, and means to draw the sections toward one another to contract the ring.

7. In a tire-retreading apparatus, the combination of a matrix ring formed in sections, and wedge means to draw the sections toward one another to contract the ring.

8. In a tire-retreading apparatus, the combination of a trough, and a matrix fitting in the trough, the trough and matrix having interfitting portions to prevent rotation of the matrix in the trough.

9. In the method of retreading a tire casing, the steps consisting in forming a matrix around the full circumference of the casing, and performing the curing operation in sections successively around the full circle of the casing before separating the tire from the matrix.

10. In the method of retreading a tire casing, the steps consisting in applying an anti-skid pattern around the full circumference of the casing, and performing the curing operation in sections successively around the full circle of the casing before separating the pattern from the tire.

Signed at San Luis Obispo, Cal. this 5th day of October 1920.

JACOB HENRY MILLER.

Witnesses:
 JOHN C. REED,
 RALPH GARDINER.